(No Model.)
J. D. SCOTT.
PIPE.
No. 565,638.    Patented Aug. 11, 1896.
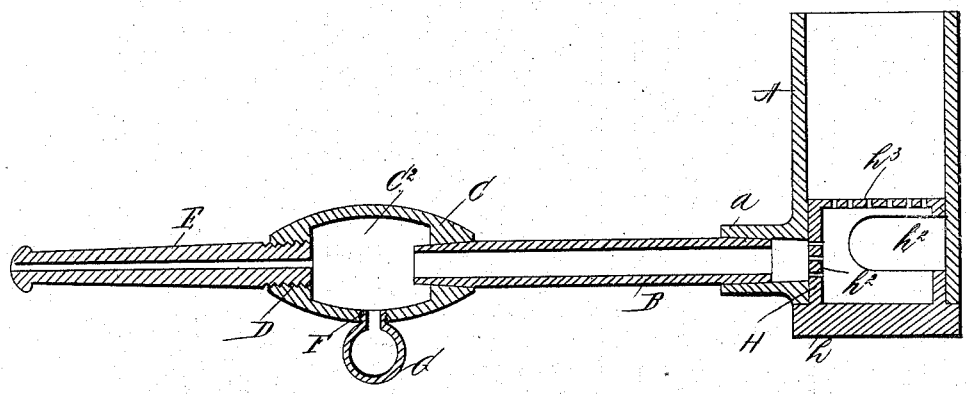
WITNESSES:
INVENTOR
James D. Scott.
BY
Edgar Tate
ATTORNEYS

UNITED STATES PATENT OFFICE.

JAMES DINSMORE SCOTT, OF RIDGEWAY, NORTH CAROLINA.

PIPE.

SPECIFICATION forming part of Letters Patent No. 565,638, dated August 11, 1896.

Application filed April 8, 1896. Serial No. 586,652. (No model.)

*To all whom it may concern:*

Be it known that I, JAMES DINSMORE SCOTT, a citizen of the United States, and a resident of Ridgeway, in the county of Warren and State of North Carolina, have invented certain new and useful Improvements in Pipes, of which the following is a specification, reference being had to the accompanying drawing, forming a part thereof, in which similar letters of reference indicate corresponding parts.

This invention relates to pipes; and the object thereof is to provide an improved device of this class which is simple in construction and operation, and the bowl of which may be quickly and easily cleaned, and the stem of which is provided with a detachable section, in which is formed an annular or enlarged chamber which is provided with a side opening or discharge-port which is adapted to receive saliva, nicotine, or other substances.

The invention is fully disclosed in the following specification, of which the accompanying drawing forms a part, said drawing being a central vertical section of the bowl of the pipe and a central longitudinal section of the stem.

In the practice of my invention I provide a pipe comprising a bowl A, which is preferably cylindrical in form and which is provided near the bottom and at one side with a tubular extension $a$, with which the stem B is connected, and the stem B is provided at its outer end with a hollow attachment C, in which is formed a chamber $C^2$, said attachment being cylindrical in cross-section and oblong in form, and the ends thereof being smaller than the central portion, and the outer end of said attachment is provided with a screw-threaded bar D, by means of which the mouthpiece E is connected therewith, and in one side of said attachment, and preferably at the bottom thereof, is an opening F, by means of which a globular or spherical receptacle G is connected therewith.

The lower end of the bowl A is open, and mounted thereon is a cylindrical casing H, which is provided with a head or end piece $h$, and said casing is adapted to be slid into the bowl, as shown in the drawing, and in one side thereof is an enlarged opening $h^2$, opposite which the side wall of the casing H is perforated, as shown at $h^2$, said perforations forming a communication between the casing and the stem B of the pipe, and the upper or inner end of said casing is closed and perforated, as shown at $h^3$, and the operation will be readily understood from the foregoing description, when taken in connection with the accompanying drawing and the following statement thereof.

In practice all dust, ashes, and other substances which pass though the perforations $h^3$ fall into the bottom of the casing H or the receptacle formed thereby, and the smoke passes through the perforations $h^2$ into the stem B and through the attachment C or the chamber $C^2$, formed therein, and out through the mouthpiece.

It will be understood that the casing H may be removed and cleaned whenever desired, the ashes and other substances being removed therefrom through the enlarged opening $h^2$ in the side thereof, and it will also be apparent that most of the nicotine will also pass into the bottom of said casing.

The chamber $C^2$ in the attachment C is adapted to receive any saliva or other fluids from the mouth that may pass into or through the mouthpiece, which may be removed therefrom whenever desired by means of the receptacle G, into which they pass, and any nicotine that passes through the perforations $h^2$ in the casing H will also pass into the chamber $C^2$, and may be removed therefrom in the same manner. I thus provide means for preventing the passage of the nicotine or other substances into the mouth, and also for preventing the passage of saliva or other fluids from the mouth into the pipe, while also preparing means by which the pipe and the stem may be quickly and easily cleaned whenever desired.

My improved pipe is simple in construction and operation, and my invention is not limited to the exact form, combination, and arrangement of parts herein described, and I reserve the right to make all such alterations therein and modifications thereof as fairly come within the scope of the invention.

Having fully described my invention, I claim as new and desire to secure by Letters Patent—

1. A pipe which is provided with a removable casing which is adapted to be inserted into the bottom thereof, and to be removed therefrom, the upper end of said casing which forms the bottom of the bowl being perforated, and the side thereof opposite the stem being provided with an enlarged opening and the side adjacent to the stem being perforated, substantially as shown and described.

2. A pipe which is provided with a removable casing which is adapted to be inserted into the bottom thereof, and to be removed therefrom, the upper end of said casing which forms the bottom of the bowl being perforated, and the side thereof opposite the stem being provided with an enlarged opening and the side adjacent to the stem being perforated, and the stem being provided with a hollow attachment in which is formed an enlarged chamber, and with the opposite end of which the mouthpiece is connected, substantially as shown and described.

3. A pipe which is provided with a removable casing which is adapted to be inserted into the bottom thereof, and to be removed therefrom the upper end of said casing which forms the bottom of the bowl being perforated, and the side thereof opposite the stem being provided with an enlarged opening, and the side adjacent to the stem being perforated, and the stem being provided with a hollow attachment in which is formed an enlarged chamber, and with the opposite end of which the mouthpiece is connected, and said attachment being also provided in the bottom thereof with a passage or opening with which a hollow receptacle is connected, substantially as shown and described.

In testimony that I claim the foregoing as my invention I have signed my name, in presence of the subscribing witnesses, this 26th day of March, 1896.

JAMES DINSMORE SCOTT.

Witnesses:
J. M. GARDNER,
J. WILLIS WHITE.